(12) United States Patent
Sakamoto (10) Patent No.: US 8,873,118 B2
(45) Date of Patent: Oct. 28, 2014

(54) PRINT CONTROL APPARATUS, PRINT CONTROL METHOD, PROGRAM, AND STORAGE MEDIUM CORRECTING IMAGES IN BAND BUFFER BASED ON AMOUNT OF CORRECTION

(75) Inventor: Yoichi Sakamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/018,753

(22) Filed: Feb. 1, 2011

(65) Prior Publication Data

US 2011/0122447 A1    May 26, 2011

Related U.S. Application Data

(63) Continuation of application No. 11/549,526, filed on Oct. 13, 2006, now Pat. No. 7,903,304.

(30) Foreign Application Priority Data

Oct. 28, 2005 (JP) ................... 2005-314706

(51) Int. Cl.
*G03F 3/08* (2006.01)
*H04N 1/387* (2006.01)

(52) U.S. Cl.
CPC ................... *H04N 1/3878* (2013.01)
USPC ............ 358/518; 358/1.17; 358/500; 358/1.7

(58) Field of Classification Search
USPC ................................... 358/1.7, 1.1
See application file for complete search history.

(56) References Cited

U.S. PATENT DOCUMENTS 6,029,041 A * 2/2000 Takano et al. ................ 399/388
6,120,196 A * 9/2000 Matsuda ........................ 400/55

OTHER PUBLICATIONS

Ikeda Hidetoshi, Printer Controller, Feb. 13, 2001, JP 2001-038964.*

* cited by examiner

*Primary Examiner* — Qian Yang
*Assistant Examiner* — Martin Mushambo
(74) *Attorney, Agent, or Firm* — Canon U.S.A., Inc. IP Division

(57) ABSTRACT

In order to perform printing by using a minimum of band buffer and correcting bending/inclination in a sub-scanning direction without making optical adjustments and using special hardware, 1-band image data are stored in the band buffer, images stored in the band buffer are corrected, images lying outside a band area are stored in an intermediate buffer, and images including images stored in the intermediate buffer and corrected images of a next band that lie inside the band area are output.

16 Claims, 7 Drawing Sheets

PRINT CONTROL APPARATUS, PRINT CONTROL METHOD, PROGRAM, AND STORAGE MEDIUM CORRECTING IMAGES IN BAND BUFFER BASED ON AMOUNT OF CORRECTION

CROSS REFERENCE TO RELATED APPLICATIONS

The present application is a Continuation of U.S. patent application Ser. No. 11/549,526 filed Oct. 13, 2006, which claims priority from Japanese Patent Application No. 2005-314706 filed Oct. 28, 2005, the entire contents of each of which are hereby incorporated by reference.

BACKGROUND OF THE INVENTION

1. Field of the Invention

The present invention relates to a print control apparatus, a print control method, a program, and a storage medium that perform printing by correcting a color deviation in a printer engine.

2. Description of the Related Art

A color deviation occurs in a tandem type color printer because a different photoreceptor is used for each color. Conventionally, optical methods such as mirror adjustments have been used for color deviation correction and particularly, for bending/inclination correction in a sub-scanning direction.

Japanese Patent Application Laid-Open No. 10-243248 proposes a method of correcting a color deviation by controlling transmission timing of an image. However, according to this method, an amount of correction cannot be changed with respect to a main scanning position and thus bending/inclination in the sub-scanning direction cannot be corrected.

Also, Japanese Patent Application Laid-Open No. 2001-38964 proposes a method of correcting bending/inclination in the sub-scanning direction by changing a readout position using three or more band buffers. However, according to this method, three or more band buffers are required and complex hardware is necessary that changes the readout position according to the amount of correction which varies in accordance with the main scanning position.

SUMMARY OF THE INVENTION

The present invention is directed to printing with a minimum of band buffers and correcting bending/inclination in a sub-scanning direction without making optical adjustments or using special hardware.

According to an aspect of the present invention, a print control apparatus includes: a band buffer for storing a 1-band image; an image correcting unit for correcting images stored in the band buffer; an intermediate buffer for storing images corrected by the image correcting unit that lie outside a band area; and an image output unit for outputting images including images stored in the intermediate buffer and image of a next band corrected by the image correcting unit that lie inside the band area.

According to another aspect of the present invention, a print control method includes: storing a 1-band image in a band buffer; correcting images stored in the band buffer; storing images that are corrected that lie outside a band area in an intermediate buffer; and outputting images including images stored in the intermediate buffer and images of a next band that are corrected b that lie inside the band area.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Exemplary Embodiment

Figure 1:
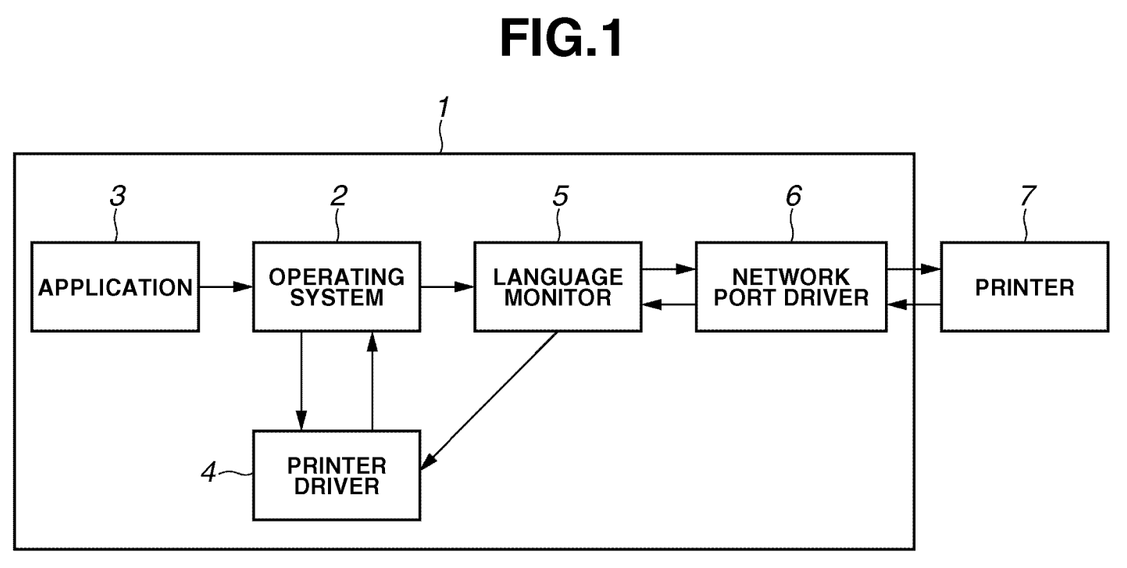
FIG. 1 is a block diagram showing an exemplary functional configuration of a print control apparatus according to an embodiment of the present invention.
Figure 7:
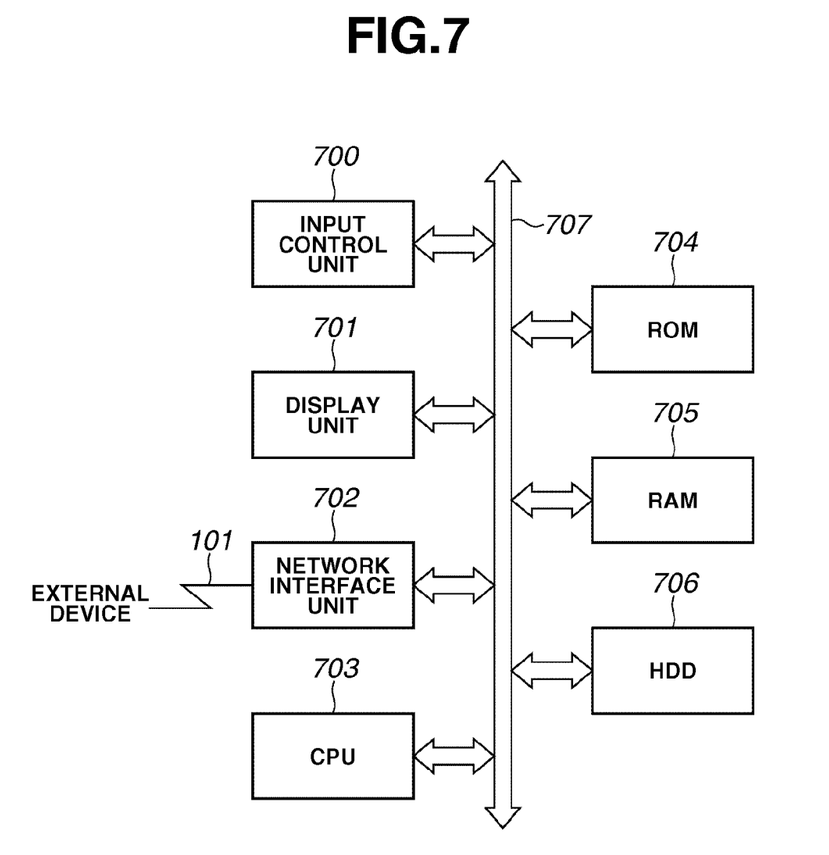
FIG. 7 is a block diagram showing exemplary hardware of a computer according to an embodiment of the present invention.

FIG. 1 is a block diagram showing a functional configuration of a print control apparatus according to an exemplary embodiment of the present invention. A computer 1 includes hardware such as a central processing unit (CPU), memory, a hard disk, a compact disk read-only memory (CDROM) drive, a keyboard, a mouse, a monitor, and a network interface. FIG. 7 is a block diagram showing exemplary hardware of the computer 1.

In FIG. 7, the computer 1 includes an input control unit 700, a display unit 701, a network interface unit 702, a CPU 703, ROM 704, random access memory (RAM) 705, a hard disk drive (HDD) 706, and an input/output interface 707.

Each of the above components is connected via the input/output interface 707. The input control unit 700 controls the keyboard/mouse that receive input from a user. The display unit 701 provides an output screen (monitor) to the user. The network interface unit 702 communicates with an external device via a network 101. The CPU 703 controls each component of the computer 1. If the computer 1 is a server computer, processing of the computer 1 is performed based on a control program stored in one of the ROM 704 and the HDD 706 shown in FIGS. 3 and 5. The ROM 704 stores the control program and data. The RAM 705 is used as a temporary storage area and a work area. The HDD 706 includes a large-capacity storage area and stores the control program and various data.

In FIG. 1, an operating system 2 manages hardware provided in the computer 1, and software such as an application 3, a printer driver 4, a language monitor 5, and a network port driver 6.

The application 3 is application software such as a word processor and carries out creation/printing of a document according to instructions of an operator.

The printer driver 4 receives a print instruction issued by the application 3 via the operating system 2 and converts the print instruction into a printer command that can be interpreted by the language monitor 5 and a printer 7.

The language monitor 5 receives the printer command issued by the printer driver 4 and transmits the printer command to the printer 7 via the network port driver 6. The language monitor 5 also notifies the printer driver 4 of density correction information and color deviation correction information received from the printer 7 via the network port driver 6.

The network port driver 6 transmits the printer command issued by the language monitor 5 to the printer 7 via the network interface. If the density correction information and color deviation correction information are received from the printer 7, the network port driver 6 outputs the density correction information and color deviation correction information to the language monitor 5.

The printer 7 performs printing according to the printer command received from the network port driver 6.

Figure 2:
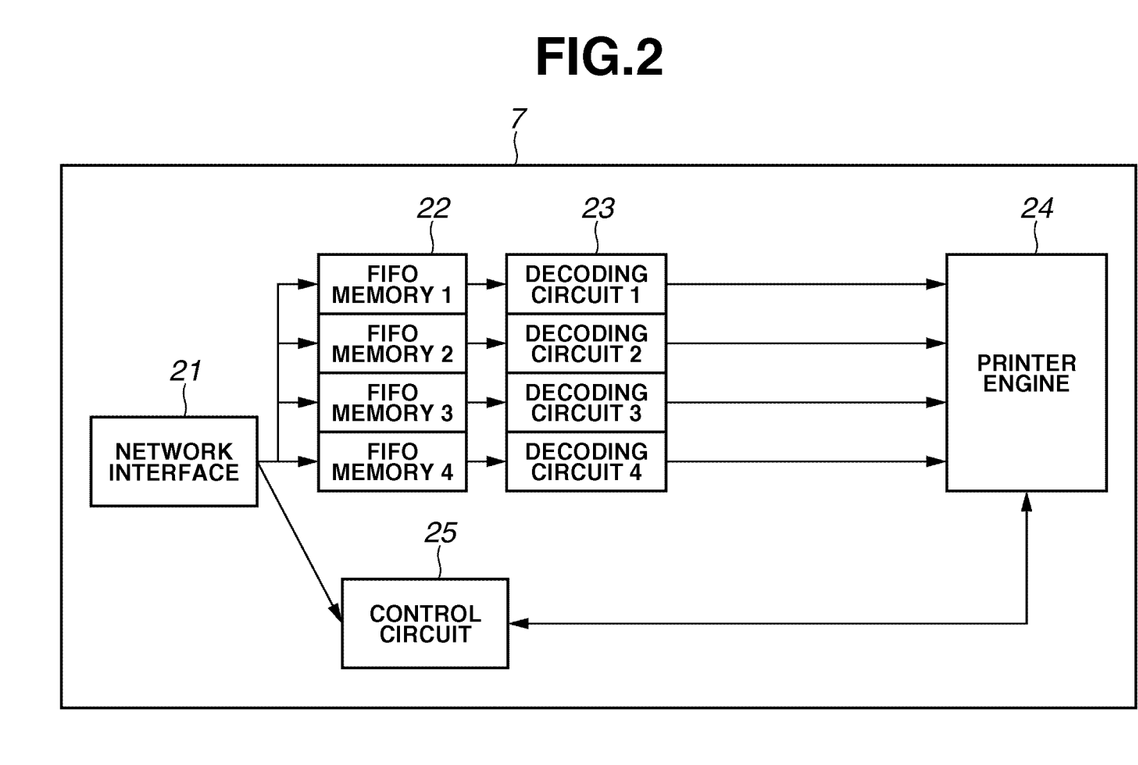
FIG. 2 is a block diagram showing details of an exemplary configuration of a printer according to an embodiment of the present invention.

FIG. 2 is a block diagram showing an exemplary configuration of the printer 7. A network interface 21 receives a printer command from the computer 1. A FIFO (first in, first out) memory 22 stores image data of each color received from the network interface 21. A decoding circuit 23 decodes image data of each color stored in the FIFO memory 22 and outputs the image data to a printer engine 24. The printer engine 24 is, for example, a laser beam printer engine and performs printing according to instructions of a control circuit 25 based on image data output from the decoding circuit 23. The control circuit 25 includes, for example, a 1-chip CPU, and controls the network interface 21, the FIFO memory 22, the decoding circuit 23, and the printer engine 24.

An exemplary printing operation is described below.

When an operator gives a print instruction operating the application 3 on the computer 1, a print directive is delivered from the application 3 to the printer driver 4 via the operating system 2. The printer driver 4 converts the print directive issued by the application 3 into image data, compresses the image data, and outputs the compressed image data together with a page start command specifying a paper size, a left margin, an upper margin, and a line length and the number of lines of bitmap data and the like, and a page end command indicating an end of a page.

When a printer command is output, the operating system 2 notifies the language monitor 5 of job start and then delivers the output printer command to the language monitor 5 one by one. When a job is started, the language monitor 5 transmits an occupancy request command to the printer 7.

If the printer 7 is successfully occupied, the language monitor 5 transmits the received printer commands to the printer 7 one by one. Before transmitting an image data command to the printer 7, the language monitor 5 transmits a status request command to acquire a status of the printer 7 and confirms that the printer 7 is ready to receive image data commands. When the image data command is received, a control circuit 25 stores the image data in the FIFO memory 22. When transmission of the printer command for one page is completed, the language monitor 5 transmits a print request command. When the print request command is received, the control circuit 25 directs the printer engine 24 to start printing.

When a print start is directed, the printer engine 24 feeds a sheet of paper and, when the sheet reaches a predetermined location, requests output of image data. When the output of image data is requested, the decoding circuit 23 reads a compressed image from the FIFO memory 22 and outputs decoded original image data to the printer engine 24. At this time, the image data read from the FIFO memory 22 is eliminated from the FIFO memory 22.

When printer commands for all pages of the job are transferred, the language monitor 5 transmits an occupancy release command without waiting until the sheet is ejected. Even after transmitting the occupancy release command, the language monitor 5 continues to acquire the status of the printer 7. The language monitor 5 frees up relevant page memory if the acquired printer status indicates that page printing is normally terminated. If an error is detected, the language monitor 5 retransmits an occupancy request command to try to restore an error page.

Next, details of processing of the printer driver 4 operating on a host are described with reference to FIG. 3. Before the processing is executed, the printer driver 4 acquires correction amount information of each color in the sub-scanning direction stored in non-volatile memory of the printer 7 at the time of starting each printing job. First, in step S1, the printer driver 4 outputs, in accordance with instructions of the application 3, the page start command that specifies the paper size, the left margin, the upper margin, the line length and the number of lines of bitmap data. At this time, as described below, the upper margin and the number of lines of bitmap data are corrected. Next, in step S11, the printer driver 4 outputs as a command, a sub-scanning correction amount at each main scanning position, as described below. Though this command is not required for printing, reference is made to the command if a sub-scanning correction is canceled later or a re-correction is made according to a correction amount of another engine.

Next, in step S2, the printer driver 4 creates a 1-band image data consisting of eight bits for each color of red, green, and blue in accordance with a drawing instruction of the application 3. Next, in step S3, the printer driver 4 converts each pixel consisting of eight bits for each color of red, green, and blue into image data consisting of eight bits for each color of yellow, magenta, cyan, and black. At this time, density is corrected by referring to density correction information acquired in advance when a job is started. Next, in step S4, the printer driver 4 performs dither processing to image data consisting of eight bits for each color of yellow, magenta, cyan, and black to convert the data into image data consisting of two bits for each color of yellow, magenta, cyan, and black. Next, in step S5, the printer driver 4 corrects color deviation in the sub-scanning direction in accordance with a color deviation correction procedure described below. At this time, since some images lie outside a band buffer, as described below, the printer driver 4 holds such images in an intermediate buffer. Next, in step S6, the printer driver 4 compresses and outputs each color of a 1-band image data. Next, in step S7, the printer driver 4 determines whether processing of all bands in the page has been completed. If processing of all bands in the page has not been completed, the printer driver 4 returns to step S2 to perform processing of the next band.

If, in step S7, it is determined that processing of all bands in the page has been completed, the printer driver 4, in step S8, compresses and outputs the data held in the intermediate buffer, that is, the image data that lay outside the band processed last. Next, in step S9, the printer driver 4 outputs a page end command. Next, in step S10, the printer driver 4 determines whether processing of all pages has been completed. If processing of all pages has not been completed, the printer driver 4 returns to step S1 to perform processing of the next page. If processing of all pages has been completed, the printer driver 4 terminates the processing.

Next, how to determine a correction amount in the sub-scanning direction is described. Before shipping from a factory, the correction amount of each color in the sub-scanning direction is measured. The measured correction amount of each color at a left end, in the center, and at aright end of maximum paper is stored in advance in non-volatile memory incorporated into the control circuit 25 of the printer 7. The printer driver 4 acquires this value from the printer 7 before starting a printing job and first approximates it using a quadratic function.

More specifically, assume that the correction amount in the sub-scanning direction at the left end, in the center, and at the right end of maximum paper be L, M, and R respectively. Then, the correction amount $Z=AX^2+BX+C$ can be calculated as shown below, where X is a position in the main scanning direction with an origin point in the center. X coordinates at the left end, in the center, and at the right end of maximum paper are $-W/2$, 0, and $W/2$ respectively, where W is a width of the maximum paper.

$$R=A(W/2)^2+B(W/2)+C$$

$$M=C$$

$$L=A(-W/2)^2+B(-W/2)+C$$

From the above equations, the following solutions are yielded:

$$A=2(R+L-2M)/W^2$$

$$B=(R-L)/W$$

$$C=M$$

Therefore, the correction amount in the sub-scanning direction Z can be calculated according to the following formula:

$$Z=2(R+L-2M)(X/W)^2+(R-L)(X/W)+M$$

Next, based on this formula, the correction amount in the sub-scanning direction will be calculated for all pixel positions in the main scanning direction. Since, at this time, correction in the sub-scanning direction is made by a line, the correction amount is rounded off to a nearest integer on a line basis.

Figure 3:
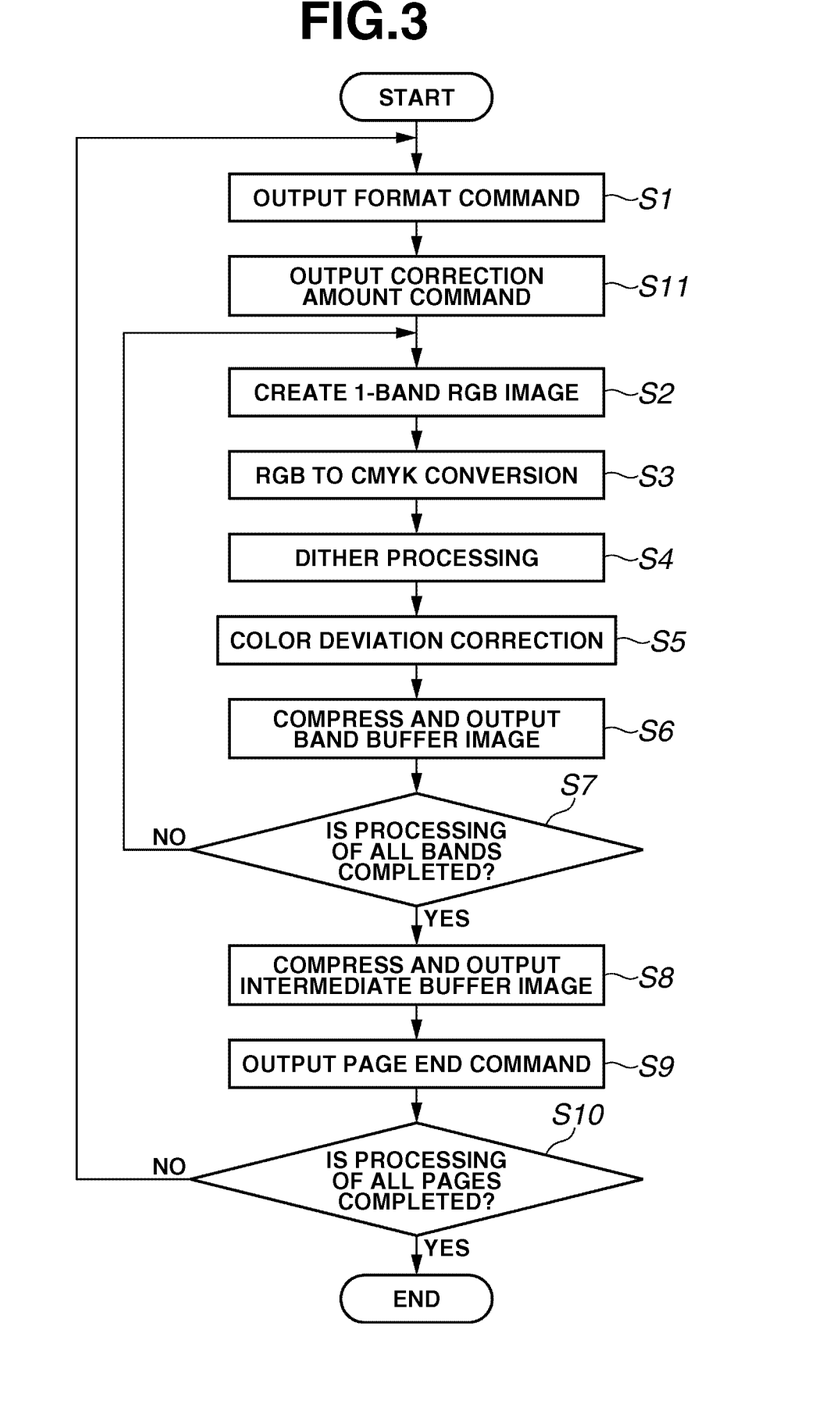
FIG. 3 is a flowchart showing exemplary processing for a printer driver according to an embodiment of the present invention.
Figure 4:
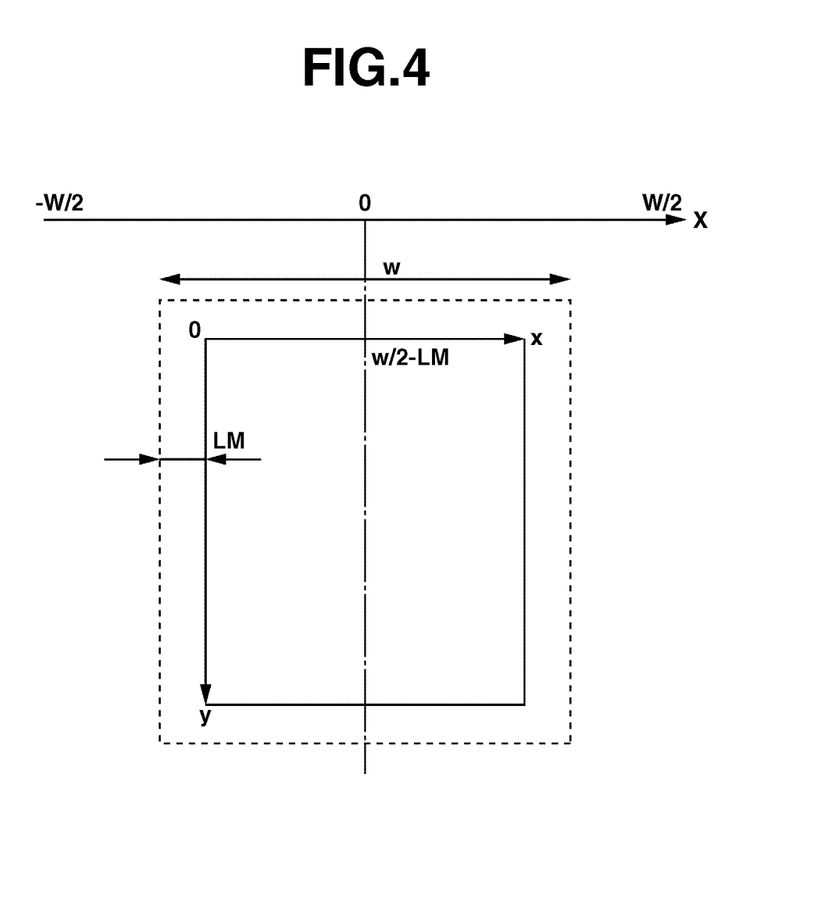
FIG. 4 is an illustration showing exemplary mapping of a main scanning position in color deviation correction in an embodiment of the present invention.

Next, it is described how to determine the correction amount in the sub-scanning direction from coordinates on a band buffer with reference to FIG. 4. If the paper size is smaller than the maximum size, the paper is generally positioned in the center. Thus, paper positioning is considered when correction is made. In FIG. 4, an upper horizontal line indicates the X axis and the center thereof is the origin point. A rectangle drawn by a broken line indicates a sheet of paper, the width thereof is w, and the center of the paper agrees with the origin of the X coordinate. A rectangle drawn by a solid line indicates an area in which the printer driver 4 creates an image in step S2 in FIG. 3, and the origin of the x and y coordinates thereof is in an upper left corner. The origin of the x coordinate is positioned a left margin LM apart from the left end of the paper. Since the origin of the X coordinate is represented by w/2−LM as the x coordinate, as shown in FIG. 4, the X coordinate will be calculated as shown below.

$$X=x+LM-w/2$$

The X coordinate value thus determined is used to calculate the correction amount Z in the sub-scanning direction from the x coordinate by the formula as described above.

Since the paper width w changes depending on the paper size and a different X corresponds to the same x, the correction amount for the same x changes depending on the paper size.

Next, details of color deviation correction processing in step S5 in FIG. 3 are described with reference to FIG. 5. In the present exemplary embodiment, one pixel includes two bits for each color and one byte contains four pixels of a specific color. Accordingly, processing is performed in a two-bit unit to change a correction amount for each pixel, which increases time required for processing. To avoid this problem, the same correction amount is applied to four pixels contained in one byte so that processing can be performed in a one-byte unit, which shortens time required for processing.

First, in step S21, the printer driver 4 sets a current color to a first color, for example, to cyan. Next, in step S22, the printer driver 4 sets a current column to a head, that is, the left end of the band buffer of the current color. Here, the column has the width of one byte. Next, in step S23, the printer driver 4 calculates the correction amount of a leftmost pixel of the current column as described above. At this time, the printer driver 4 makes reference to the color deviation correction information acquired in advance when starting a job so as to calculate the correction amount. Since, in the present embodiment, one pixel includes two bits for each color, one byte contains four pixels of specific colors. However, the correction amount of the leftmost pixel in one byte is similarly applied to four pixels in one byte so that processing can be performed in a one-byte unit, as described above. Next, in step S24, the printer driver 4 adds a maximum correction amount to the correction amount to obtain a positive value or 0. For example, if the correction amount is between −20 lines to 20 lines, the maximum correction amount of 20 lines is added to obtain 0 line and 40 lines. This processing enables avoiding a case in which processing cannot be performed. Otherwise, when the correction amount becomes a negative value as a result of correcting data in the current band, the data moves to the position of a previous band in which processing is completed.

Next, in step S25, the printer driver 4 sets the current byte to the end of the current column, that is, to the current column in the last line of the band buffer. Next, in step S26, the printer driver 4 calculates a correction position of the current byte to determine whether the correction position is within the band buffer. More specifically, the printer driver 4 determines whether the position of the current byte below the correction number of lines calculated in step S24 is within the band buffer. If the correction position of the current byte is within the band buffer, in step S27, the printer driver 4 copies the current byte to the correction position calculated in step S26 and then proceeds to step S28. If the correction position of the current byte is not within the band buffer, in step S36, the printer driver 4 copies the current byte to a position according to the number of lines lying outside the band buffer in a second intermediate buffer, and then proceeds to step S28.

In step S28, the printer driver 4 moves up the current byte position by one line. Next, in step S29, the printer driver 4 determines whether processing of one column is completed, that is, whether the current byte position is outside a head position of the band buffer. If processing of one column is not completed, the printer driver 4 returns to step S26 to continue processing of the current column. If processing of one column is completed, in step S30, the printer driver 4 copies data by the number of correction lines calculated in step S24, from the head line of the current column, from a first intermediate buffer to the band buffer. The first intermediate buffer is assumed to be filled in advance with blank pixels. Next, in step S31, the printer driver 4 moves the current column rightward by one byte. Next, in step S32, the printer driver 4 determines whether processing of all columns is completed. If processing of all columns is not completed, the printer driver 4 returns to step S23 to start processing of the next column.

If processing of all columns is completed, in step S33, the printer driver 4 copies content of the second intermediate buffer to the first intermediate buffer of the current color. Next, in step S34, the printer driver 4 sets the current color to the next color. Next, in step S35, the printer driver 4 determines whether processing of all colors is completed. If processing of all colors is not completed, the printer driver 4 returns to step S22 to start processing of the next color. If processing of all colors is completed, the printer driver 4 terminates color deviation correction processing. The number of lines in the upper margin performed in step S1 shown in FIG. 3 is corrected by subtracting a value to be added to the correction amount (i.e., the maximum correction amount) in step S24. By performing this processing, increase of the upper margin caused by addition of a correction amount in step S24 can be canceled. The number of lines in bitmap data performed in step S1 shown in FIG. 3 is corrected by adding the number of lines in the intermediate buffer. Since the number of lines in the intermediate buffer is twice the maximum amount, that value is added.

Figure 5:
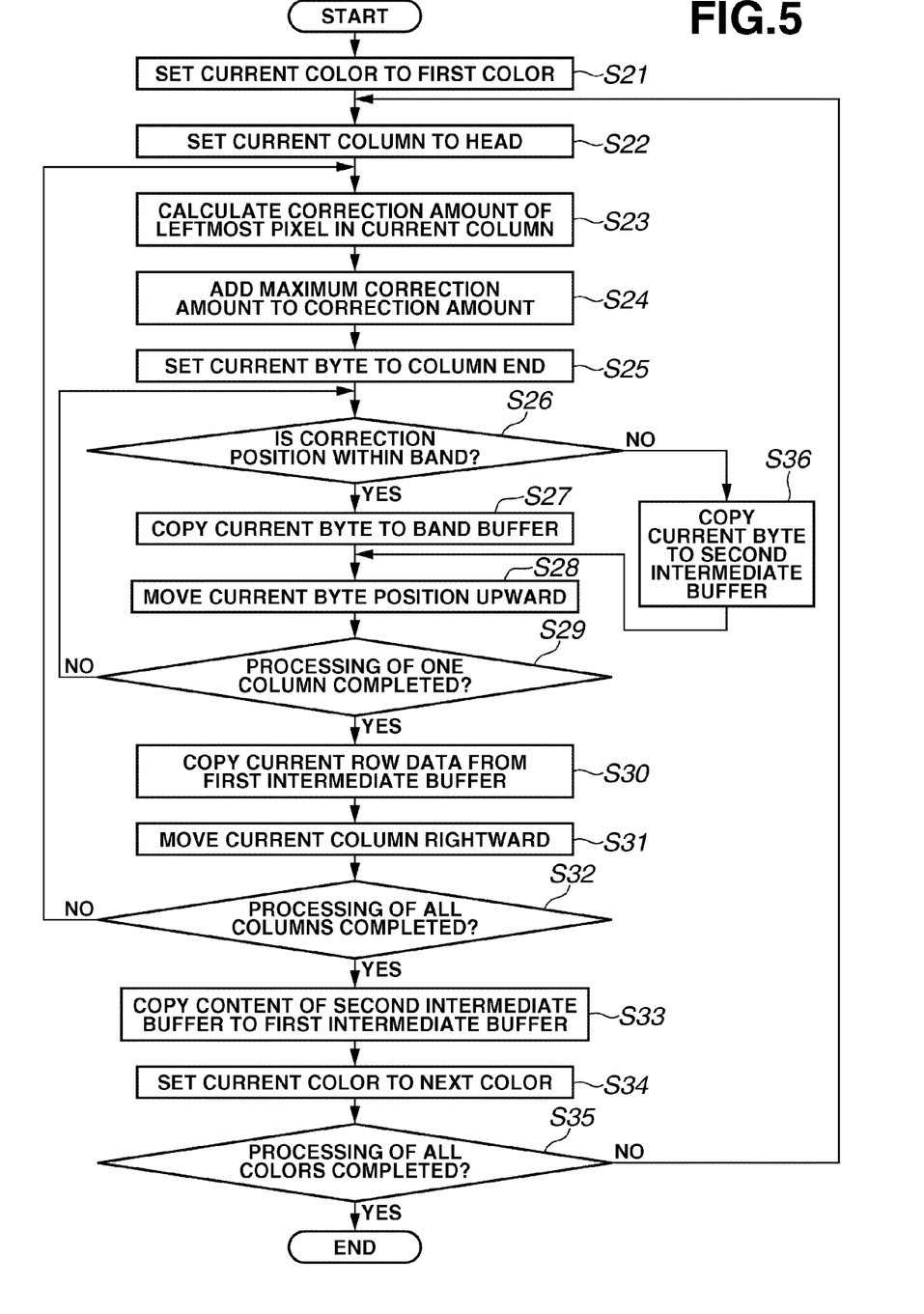
FIG. 5 is a flowchart showing exemplary processing for color deviation correction in an embodiment of the present invention.
Figure 6:
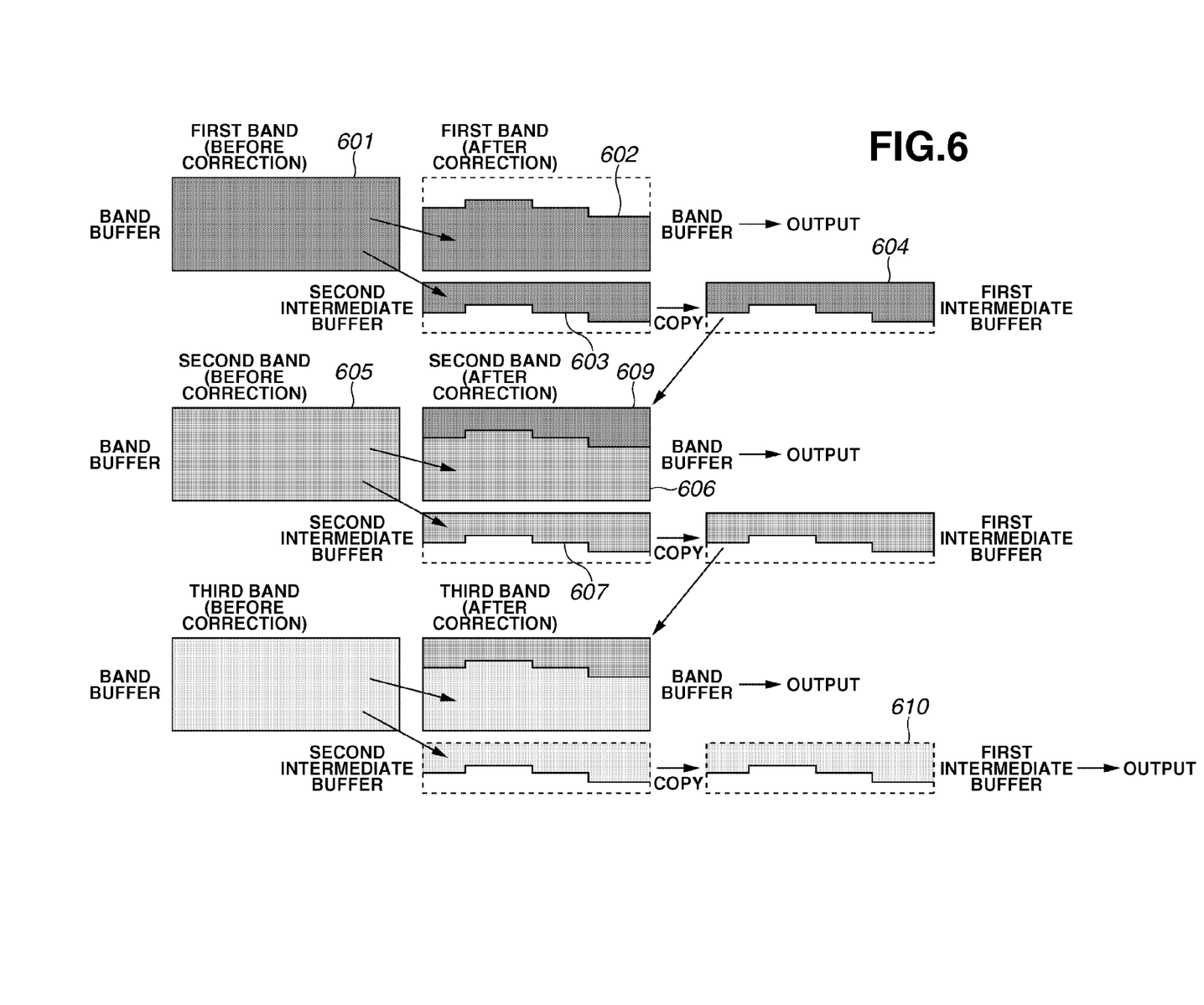
FIG. 6 is an illustration showing an exemplary flow of data for color deviation correction in an embodiment of the present invention.

Next, processing in FIG. 5 is described by taking horizontal bands (lateral direction: main scanning direction), as shown in FIG. 6, as an example. First, image data in a byte unit at a lower left of a band is written in one of the band buffer and the intermediate buffer in accordance with the correction amount. Next, image data in a byte unit immediately above (longitudinal direction: sub-scanning direction) is written in one of the band buffer and the intermediate buffer in accordance with the correction amount. Image data in a byte unit immediately above is processed sequentially until processing of image data for the band in the longitudinal direction is completed. Then, image data in a byte unit immediately to the right of the image data in a byte unit at the lower left is written in one of the band buffer and the intermediate buffer in accordance with the correction amount. Then, image data in a byte unit immediately above is sequentially processed.

In the above example, processing in the longitudinal direction (sub-scanning direction) has been described, however, a system in which processing is performed in the lateral direction (main scanning direction) can also be realized. More specifically, image data in a byte unit at a lower left of a band is written in one of the band buffer and the intermediate buffer in accordance with the correction amount. Next, image data in a byte unit immediately to the right (lateral direction: main scanning direction) is written in one of the band buffer and the intermediate buffer in accordance with the correction amount. Image data in a byte unit immediately to the right is processed sequentially until processing of image data for the band in the lateral direction is completed. Then, image data in a byte unit immediately above the image data in a byte unit at the lower left is written in one of the band buffer and the intermediate buffer in accordance with the correction amount. Then, image data in a byte unit immediately to the right is processed sequentially.

Next, a flow of data caused by color deviation correction processing will be described with reference to FIG. 6. First, image data 601 in a first band is formed in the band buffer. When color deviation correction processing is invoked, a correction is made in accordance with the correction amount in the sub-scanning direction. The image data 601 is divided into data 602 that remains in the band buffer, and data 603 that lies outside the band buffer and is stored in the second intermediate buffer. The data 603 stored in the second intermediate buffer is copied to the first intermediate buffer as image data 604 when processing of the first band is completed. Next, image band 605 in a second band is formed in the band buffer. When color deviation correction processing is invoked, the image data 605 is divided into data 606 that remains in the band buffer, and data 607 that lies outside the band buffer and is stored in the second intermediate buffer. Further, the data 604 held in the first intermediate buffer that lay outside the first band is stored in the band buffer as image data 609.

Correction processing is performed sequentially in this manner. After processing of the last band is performed, data 610 that lay outside the last band is held in the first intermediate buffer. The data 610 is output by processing in step S8 shown in FIG. 3.

Second Exemplary Embodiment

A second exemplary embodiment of the present invention is described next. In the second exemplary embodiment, color deviation correction processing is performed before dither processing. More specifically, dither processing in step S4 and color deviation correction processing in step S5 shown in FIG. 3 are interchanged. Since an image before dither processing includes eight bits for each color, a correction amount for each pixel is calculated in color deviation correction processing without applying the same correction amount to four pixels.

Third Exemplary Embodiment

A third exemplary embodiment of the present invention is described next. In the third exemplary embodiment, the printer engine 24 has a two-sided printing mechanism. In the case of two-sided printing, while printing on a first side is generally center-aligned like single-sided printing, printing on a second side can be left-aligned. In such a case, the correction amount calculated in step S23 shown in FIG. 5 is calculated using center alignment for the first side of two-sided printing, similar to the first embodiment and using left alignment for the second side of two-sided printing. More specifically, instead of X=x+LM−w/2 described above, the same formula as the maximum paper, that is, X=x+LM−W/2 can be used for calculation regardless of the paper width.

When the two-sided printing is performed, depending on a combination of a paper transfer direction (longitudinal feed and transverse feed) and a binding direction (longer side binding and shorter side binding), an image on the first side must be rotated by 180°, but this processing can be performed by creating a rotated image in advance in step S2 shown in FIG. 3.

Other Embodiments

In the above-described exemplary embodiments, image creation and color deviation corrections are performed by a host computer, but instead other methods can also be used. For example, the printer driver 4 can output a page description language without performing image creation and color deviation corrections so that the printer 7 can perform, based on the received page description language, image creation and color deviation corrections.

As described above, by using the band buffer with a set of four colors, the first intermediate buffer with a set of four colors, and the temporary intermediate buffer with a set of one color, color deviation corrections in the sub-scanning direction can be performed, and printing can be executed without preparing special hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A print control apparatus comprising:
   a first storing unit configured to store a 1-band image in a band buffer;
   an obtaining unit configured to obtain a correction amount of the 1-band image stored in the band buffer;
   a calculating unit configured to calculate a correction position of each part of the stored 1-band image on the basis of the obtained correction amount;
   a writing unit configured to,
      write a part of the stored 1-band image at the calculated correction position in the band buffer in a case where the calculated correction position of the part is within an area of the band buffer corresponding to the stored 1-band image, and
      write a part of the stored 1-band image in an intermediate buffer in a case where the calculated correction position of the part is not within the area of the band buffer; and
   a second storing unit configured to store, in the band buffer, the part of the 1-band image stored in the intermediate buffer.

2. The print control apparatus according to claim 1, further comprising:
   an outputting unit configured to output, to a printer, a whole image in the band buffer after the second storing unit stores in the band buffer the part of the 1-band image stored in the intermediate buffer by the shifting unit.

3. The print control apparatus according to claim 2, wherein the outputting unit compresses the whole image and outputs the compressed whole image to the printer.

4. The print control apparatus according to claim 2, wherein
   the first storing unit stores another 1-band image in the band buffer before the second storing executes the storing;
   the writing unit writes a part of the stored another 1-band image at the calculated correction position in the band buffer in a case where the calculated correction position of the part is within an area of the band buffer corresponding to the stored another 1-band image, before the second storing unit executes the storing;
   the second storing unit executes the storing; and
   the outputting unit executes the outputting.

5. The print control apparatus according to claim 1, wherein the obtaining unit obtains, as the correction amount, a correction amount in a sub-scanning direction at three positions in a main scanning direction.

6. The print control apparatus according to claim 1, wherein the correction amount on a front surface of a material is different from a correction amount on a back surface of the material.

7. The print control apparatus according to claim 1, including a host computer.

8. A print control method performed in a print control apparatus which includes a band buffer and an intermediate buffer, the method comprising:
   storing a 1-band image in the band buffer;
   obtaining a correction amount of the 1-band image stored in the band buffer;
   calculating a correction position of each part of the stored 1-band image on the basis of the obtained correction amount;
   writing a part of the stored 1-band image at the calculated correction position in the band buffer in a case where the calculated correction position of the part is within an area of the band buffer corresponding to the stored 1-band image;
   writing a part of the stored 1-band image in an intermediate buffer in a case where the calculated correction position of the part is not within the area of the band buffer; and
   storing, in the band buffer, the part of the 1-band image stored in the intermediate buffer.

9. The print control method according to claim 8, further comprising:
   outputting to a printer, a whole image in the band buffer after the second storing is executed.

10. The print control method according to claim 9, wherein the outputting includes compressing the whole image and outputting the compressed whole image to the printer.

11. The print control method according to claim 9, further comprising:
    storing another 1-band image in the band buffer before the storing of the part of the 1-band image stored in the intermediate buffer is executed; and
    writing a part of the stored another 1-band image at the calculated correction position in the band buffer in a case where the calculated correction position of the part is within an area of the band buffer corresponding to the stored another 1-band image, before the storing of the part of the 1-band image stored in the intermediate buffer is executed.

12. The print control method according to claim 8, wherein the obtaining includes obtaining as the correction amount, a correction amount in a sub-scanning direction at three positions in a main scanning direction.

13. The print control method according to claim 8, wherein the correction amount on a front surface of a material is different from a correction amount on a back surface of the material.

14. The print control method according to claim 8, wherein the print control apparatus includes a host computer.

15. A non-transitory computer readable medium storing a program for causing a computer to execute the method according to claim 8.

16. A print control apparatus comprising:
    a first storing unit configured to store a 1-band image in a band buffer;
    an obtaining unit configured to obtain a correction amount of the 1-band image stored in the band buffer ;
    a shifting unit configured to shift the 1-band image stored in the band buffer in a sub-scanning direction within the band buffer on the basis of the obtained correction amount, whereby a part of the 1-band image stored by the first storing unit is shifted out of an area of the band buffer corresponding to the 1-band image stored by the first storing unit and the rest of the 1-band image stored by the first storing unit remains stored in the area of the band buffer, wherein the shifting unit is configured to store, in an intermediate buffer, the part of the 1-band image that is shifted out of the area of the band buffer;
    a second storing unit configured to store, in the band buffer, the part of the 1-band image that is shifted out of the area of the band buffer and stored in the intermediate buffer by the shifting unit, wherein, in a case where the shifting unit shifts the 1-band mage within the band buffer, the shifting unit is configured to:
(a) calculate a correction position of a part of the 1-band image stored in the band buffer by the first storing unit; and
(b) write the part of the 1-band image stored in the band buffer by the first storing unit at the calculated correction position in the band buffer, wherein, in a case where the calculated correction position of a part of the 1-band image is within the area of the band buffer, the shifting unit is configured to write the part of the 1-band image at the calculated correction position in the area of the band buffer, whereby the part of the 1-band image remains stored in the area of the band buffer, and wherein, in a case where the calculated correction position of a part of the 1-band image is not within the area of the band buffer, the shifting unit is configured to write the part of the 1-band image in the intermediate buffer, whereby the part of the 1-band image is shifted out of outside the area of the band buffer and is stored in the intermediate buffer.

* * * * *